(12) United States Patent
Zou et al.

(10) Patent No.: US 11,244,298 B2
(45) Date of Patent: Feb. 8, 2022

(54) PAYMENT DEVICE, PAYMENT SYSTEM AND PAYMENT METHOD

(71) Applicants:BOE TECHNOLOGY GROUP CO., LTD., Beijing (CN); BEIJING BOE DISPLAY TECHNOLOGY CO., LTD., Beijing (CN)

(72) Inventors: Bin Zou, Beijing (CN); Feng Bai, Beijing (CN); Miao Liu, Beijing (CN); Liyan Wang, Beijing (CN); Hongna Ye, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 811 days.

(21) Appl. No.: 15/518,116

(22) PCT Filed: Mar. 7, 2016

(86) PCT No.: PCT/CN2016/075799
§ 371 (c)(1),
(2) Date: Apr. 10, 2017

(87) PCT Pub. No.: WO2016/155470
PCT Pub. Date: Oct. 6, 2016

(65) Prior Publication Data
US 2017/0308884 A1    Oct. 26, 2017

(30) Foreign Application Priority Data

Apr. 1, 2015 (CN) .......................... 201510152761.3

(51) Int. Cl.
*G06Q 40/00*    (2012.01)
*G06Q 20/20*    (2012.01)
(Continued)

(52) U.S. Cl.
CPC ....... *G06Q 20/206* (2013.01); *G06K 9/00087* (2013.01); *G06Q 20/40145* (2013.01);
(Continued)

(58) Field of Classification Search
CPC ..... G06Q 20/206; G06K 9/00087; G07G 5/00
See application file for complete search history.

(56) References Cited

U.S. PATENT DOCUMENTS 10,504,094 B1 *  12/2019  Gaudin ................. G06Q 20/36
10,949,830 B1 *   3/2021  Gaudin ............... G06Q 20/327
(Continued)

FOREIGN PATENT DOCUMENTS

CN    101482950 A     7/2009
CN    201876941   *   6/2011   ........... G06Q 20/206
(Continued)

OTHER PUBLICATIONS

Copeland et al., "Wallet on Wheels—Using Vehicle's Identity for Secure Mobile Money," 17th International Conference on Intelligence in Net Generation Networks (ICIN) 2013 (Year: 2013).*
(Continued)

*Primary Examiner* — Alexander G Kalinowski
*Assistant Examiner* — William B. Bunker

(57) ABSTRACT

A payment system, comprising: a receipt apparatus; a payment apparatus, the payment apparatus being connected to the receipt apparatus by means of electromagnetic induction, such that the receipt apparatus can receive information about the payment apparatus; and an identity recognition apparatus, the identity recognition apparatus being disposed in a payment environment and separated from the payment apparatus spatially, and the identity recognition apparatus being in signal connection with the receipt apparatus, wherein when a payer pays money, the identity recognition apparatus is used for recognising identity information about the payer,
(Continued)

wherein the payment environment is a place where the receipt apparatus and the payment apparatus are located simultaneously. The payment system ensures the safety, convenience and efficiency of payment. Also provided are a payment device and a payment method.

4 Claims, 4 Drawing Sheets

(51) Int. Cl.
    *G06Q 20/40*     (2012.01)
    *G06K 9/00*     (2022.01)
    *G07G 5/00*     (2006.01)
    *G06K 7/08*     (2006.01)
    *G06K 7/10*     (2006.01)
    *G06K 19/07*     (2006.01)

(52) U.S. Cl.
    CPC .............. *G07G 5/00* (2013.01); *G06K 7/083* (2013.01); *G06K 7/10336* (2013.01); *G06K 9/00006* (2013.01); *G06K 9/00268* (2013.01); *G06K 19/07* (2013.01)

(56) References Cited

U.S. PATENT DOCUMENTS

| | | | | |
|---|---|---|---|---|
| 2004/0254861 A1* | 12/2004 | Pentel | ................ | G06Q 20/1085 235/384 |
| 2004/0260610 A1* | 12/2004 | Hasegawa | .............. | G06Q 30/06 705/18 |
| 2005/0184155 A1* | 8/2005 | Pinkus | ...................... | G07F 7/02 235/449 |
| 2008/0015985 A1* | 1/2008 | Abhari | ................... | G06Q 20/10 705/42 |
| 2008/0091619 A1* | 4/2008 | Perlman | ................ | G06Q 20/29 705/76 |
| 2010/0280956 A1* | 11/2010 | Chutorash | .............. | G06Q 20/20 705/64 |
| 2013/0218721 A1* | 8/2013 | Borhan | ................ | G06Q 20/322 705/26.41 |
| 2015/0317615 A1* | 11/2015 | Bryant, II | ............ | G06Q 20/401 705/44 |
| 2016/0035013 A1* | 2/2016 | Plattenburg | ........ | G06Q 30/0641 705/27.1 |
| 2016/0042341 A1* | 2/2016 | Griffin | .................... | G06F 21/41 705/44 |
| 2016/0110796 A1* | 4/2016 | Chang | ................ | G06Q 30/0641 705/26.8 |
| 2016/0162879 A1 | 6/2016 | Mu | | |
| 2016/0185358 A1* | 6/2016 | Todasco | ................ | B60W 40/09 701/48 |
| 2017/0064554 A1 | 3/2017 | Li | | |
| 2017/0116600 A1* | 4/2017 | Sharan | .................... | G06Q 20/36 |
| 2019/0054899 A1* | 2/2019 | Hoyos | .................. | H05K 999/99 |
| 2019/0073656 A1* | 3/2019 | Joseph | ................ | G07G 1/0081 |

FOREIGN PATENT DOCUMENTS

| | | | | |
|---|---|---|---|---|
| CN | 202306710 A | | 7/2012 | |
| CN | 102968717 A | | 3/2013 | |
| CN | 102582577 A | | 6/2013 | |
| CN | 103426084 A | | 12/2013 | |
| CN | 103886453 A | | 6/2014 | |
| CN | 103942899 A | | 7/2014 | |
| CN | 103944728 A | | 7/2014 | |
| CN | 103985038 A | | 8/2014 | |
| CN | 104021474 A | | 9/2014 | |
| CN | 104715373 A | | 6/2015 | |
| CN | 104933555 | * | 9/2015 | ............ G06Q 20/20 |
| KR | 2001-0087726 | * | 9/2001 | ............ B06R 25/25 |
| WO | WO-9946717 A1 | * | 9/1999 | .......... G06Q 20/363 |
| WO | WO-2007049273 A2 | * | 5/2007 | ............ G06Q 20/40 |

OTHER PUBLICATIONS

Kopparapu, "A Robust Speech Biometric System for Vehicle Access," ICVES 2009. (Year: 2009).*
International Search Report and Written Opinion dated Jun. 3, 2016; PCT/CN2016/075799.
The First Chinese Office Action dated Jul. 31, 2017; Appln. No. 201510152761.3.

\* cited by examiner

PAYMENT DEVICE, PAYMENT SYSTEM AND PAYMENT METHOD

TECHNICAL FIELD

Embodiments of the present disclosure relate to a payment apparatus, a payment system and a payment method.

BACKGROUND

At present, contactless mobile payment is popular for people from all walks of life. In contactless mobile payment, payment can be conducted by a paying device and a collecting device without direct contact therebetween, that is, the collecting device can deduct a spending amount from the paying device directly, when the distance between the two devices is within a limit. However, if the environment in which the paying device and the collecting device are located is spatially limited, i.e. has a narrow space, the paying device is prone to be false triggered to perform a mistaken payment, causing property loss for the payer.

In the situations susceptible to false triggering described above, an existing secure method of payment is to configure the collecting device with a fingerprint reader. In this way, the payer needs to put his finger on the fingerprint reader of the collecting device when performing payment and the payment can be completed if the fingerprint is identified and in turn the identity of the payer is authenticated.

Although payment can be secured by the means described above, the collecting device has to be moved to a place accessible for the payer to put his finger in direct contact with the collecting device, and it may be inconvenient to move the collecting device within a narrow space. As a result, this method appears to be not convenient and efficient enough to satisfy a high requirement for timeliness of payment.

SUMMARY

To resolve the technical problems of inconvenience, inefficiency and insufficient security of existing mobile payment technologies, embodiments of the present disclosure provide a payment apparatus, a payment system and a payment method.

According to an aspect of this disclosure, a payment system is provided, comprising: a collecting device, a paying device that is connected with the collecting device through electromagnetic induction, so that the collecting device can receive information from the paying device, an identification device that is disposed in a payment environment to be spatially separate from the paying device and in signal connection with the collecting device, so that it can be used to identify the identity information of a payer when the payer is to pay an amount of money, wherein the payment environment refers to the place where the collecting device and the paying device are located at the same time.

Electively, the identification device includes a fingerprint identifying unit.

Electively, when the payment environment is in a vehicle, the identification device is disposed at at least one of the following locations in the payment environment: a door handle inside the vehicle, the button of a glass frame riser in the vehicle, a safety belt buckle and a regulating lever at a side of a seat.

Electively, the identification device includes a face recognizing unit.

Electively, when the payment environment is in a vehicle, the identification device is disposed at at least one of the following locations in the payment environment: the back of a seat in the vehicle, the console of the vehicle, a safety belt buckle and vicinity of a reflecting mirror in the vehicle.

Electively, the collecting device further has an identification prompting unit disposed therein to prompt that the payer's identity information needs to be identified.

Electively, further comprising a payment control equipment, wherein the collecting device is connected with the payment control equipment through network, so that the collecting device is used to send the payer's identity information to and receive verification result of the payer's identity information from the payment control equipment.

According to another aspect of this disclosure, a payment method is provided, comprising: receiving payment information by a collecting device from a paying device, wherein the paying device and the collecting device are within a preset distance range and in indirect contact; receiving, by the collecting device, the identity information entered by a payer using an identification device in a payment environment, wherein the payment environment refers to the place where the collecting device and the paying device are located; and deducting the payer's spending amount by the collecting device when the identity information of the payer is verified to be correct.

Electively, receiving payment information by the collecting device from the paying device comprises: sending prompting information by the collecting device to the paying device; and receiving the payment information by the collecting device from the paying device when the paying device has received the prompting information from the collecting device.

Electively, after receiving, by the collecting device, the identity information entered by the payer using the identification device in the payment environment, the payment method further comprises: sending the identity information by the collecting device through network to the payment control equipment networked with the collecting device; and receiving the verification result of the identity information of the payer by the collecting device from the payment control equipment and deducting the payer's spending amount by the collecting device when the verification result indicates that the payer's identity information is correct.

Electively, after receiving the payment information by the collecting device from the paying device, the payment method further comprises: determining, by the paying device, whether identification is needed; and receiving, by the identification device, the identity information entered by the payer, if needed.

Electively, the prompting information includes voice and/or visual prompting information.

Electively, the identity information includes fingerprint identifying information and/or face recognizing information.

According to another aspect of this disclosure, a payment apparatus is provided, comprising: a collecting device comprising a transceiver to build signal connection with and be able to receive information from a paying device, and an identification device that is disposed in a payment environment to be spatially separate from the paying device and in signal connection with the collecting device, the identification device is used to identify the identity information of a payer when the payer is to pay an amount of money, wherein the payment environment refers to the place where the collecting device and the paying device are located at the same time.

Electively, the identification device includes a fingerprint identifying unit.

Electively, when the payment environment is in a vehicle, the identification device is disposed at at least one of the following locations in the payment environment: a door handle inside the vehicle, the button of a glass frame riser in the vehicle, a safety belt buckle and a regulating lever at a side of a seat.

Electively, the identification device includes a face recognizing unit.

Electively, when the payment environment is in a vehicle, the identification device is disposed at at least one of the following locations in the payment environment: the back of a seat, the console of the vehicle, the buckle of a safety belt and vicinity of a reflecting mirror inside the vehicle.

Electively, the collecting device further has an identification prompting unit disposed therein to prompt that the payer's identity information needs to be identified.

BRIEF DESCRIPTION OF DRAWINGS

In order to make the embodiments of the disclosure apparent, the drawings related to the embodiments of the disclosure will be described briefly. Apparently, the described embodiments are just a part of the embodiments of the disclosure. For those skilled in the art, he or she can obtain other figure(s) according to these figures, without any inventive work.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Embodiment 1

Embodiment 1 of the present disclosure provides a payment system 10 including a collecting device 11 and a paying device 12, wherein the collecting device may be a mobile POS (Point of Sale) machine, a computer terminal, a card reader or the like, and the paying device may be an intelligent watch, an intelligent mobile phone, an intelligent card or the like. The paying device 12 and the collecting device 11 are connected with each other through electromagnetic induction, for example, the collecting device 11 and the paying device 12 may be connected with each other through Bluetooth, Wi-Fi (Wireless-Fidelity), NFC (Near Field Communication), radio frequency or other communication mode. In this respect, the present disclosure is not limited. Thereby, the collecting device 11 can communicate with the paying device 12, for example, receive information from the paying device 12.

Figure 1:
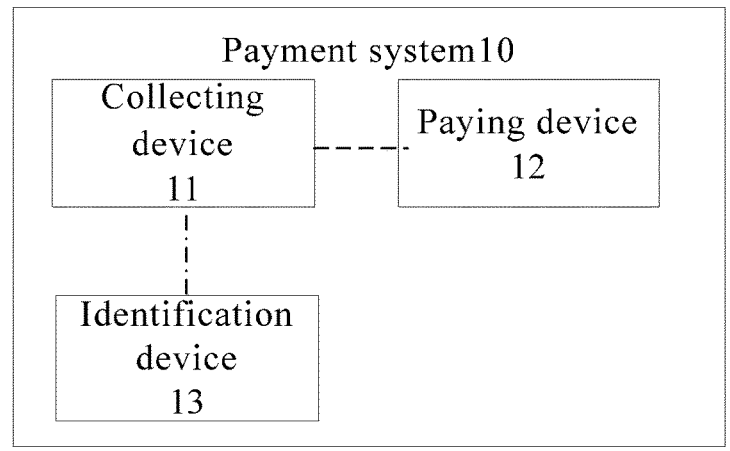
FIG. 1 is a structure diagram of a payment system provided in embodiment 1 of the present disclosure.

As shown in FIG. 1, in addition to the collecting device 11 and the paying device 12, the payment system 10 further includes an identification device 13.

The identification device 13 is located in a payment environment, spatially separate from the paying device and in signal connection with the collecting device 11. When the payer is paying an amount of money, the identification device 13 is used to identify the identity information of the payer.

The identification device 13 may use a fingerprint identifying sensor, a face recognizing sensor, an audio sensor and the like individually or in combination, which has no limitation on embodiments of the present disclosure.

The payment environment means the place in which the collecting device 11 and the paying device 12 are located at the same time. For example, the place may be a vehicle, a checkout counter, a payment window or the like, to which embodiments of the present disclosure are not limited.

The identification device 13 may be in signal connection with the collecting device 11 through wired or wireless connection. And the wireless connection may use Bluetooth, Wi-Fi (Wireless-Fidelity), NFC (Near Field Communication), RF or other communication, to which the present disclosure is not limited.

In the payment system 10 provided in embodiment 1 of the present disclosure, an identification device is disposed in the payment environment to be in signal connection with the collecting device. When the payer is paying an amount of money, the identification device is used to identify the identity information of the payer. From this it can be seen that in this payment system the payment can be completed without direct contact between the payer and the collecting device by disposing an identification device in the payment environment other than in the collecting device. In this way, the payment security is improved, and the payer is provided with convenience for payment and in turn a higher user experience. In addition, although the existing fingerprint identifying unit can be disposed in the paying device of a payer, each paying device needs to have a fingerprint identifying unit disposed therein, increasing the cost of the paying device.

Optionally, the identification device 13 may include a fingerprint identifying unit 131, and when the payment environment is in a vehicle, the identification device 13 may be disposed at at least one of the following locations in the payment environment: a door handle inside the vehicle, the button of a glass frame riser in the vehicle, a safety belt buckle and a lateral seat regulating lever. The payment can be secure and convenient to bring about a higher user experience by disposing a fingerprint identifying unit in a region within the range accessible by the payer.

Figure 2A:
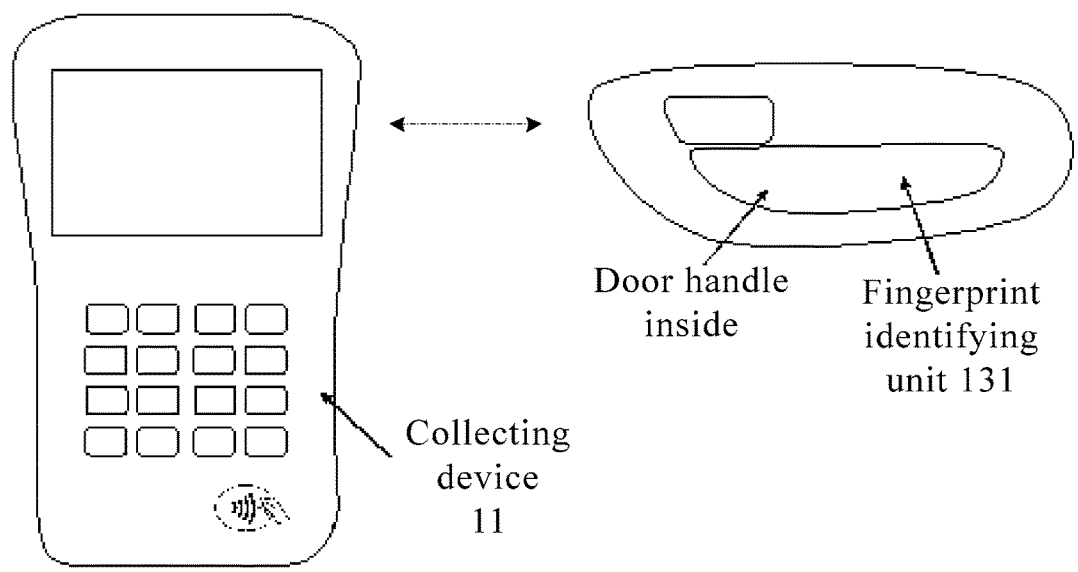
FIG. 2a is an example structure diagram of the payment system provided in embodiment 1 of the present disclosure.

For example, as shown in FIG. 2a, if the identification device 13 including the fingerprint identifying unit 131 is disposed on a door handle inside the vehicle, when a customer in the vehicle is to pay, he just needs to press his finger on the fingerprint identifying unit 131 on the door handle to send his identity information to the collecting device 11 and at the same time open the door, so that both security and efficiency of payment are achieved.

Figure 2B:
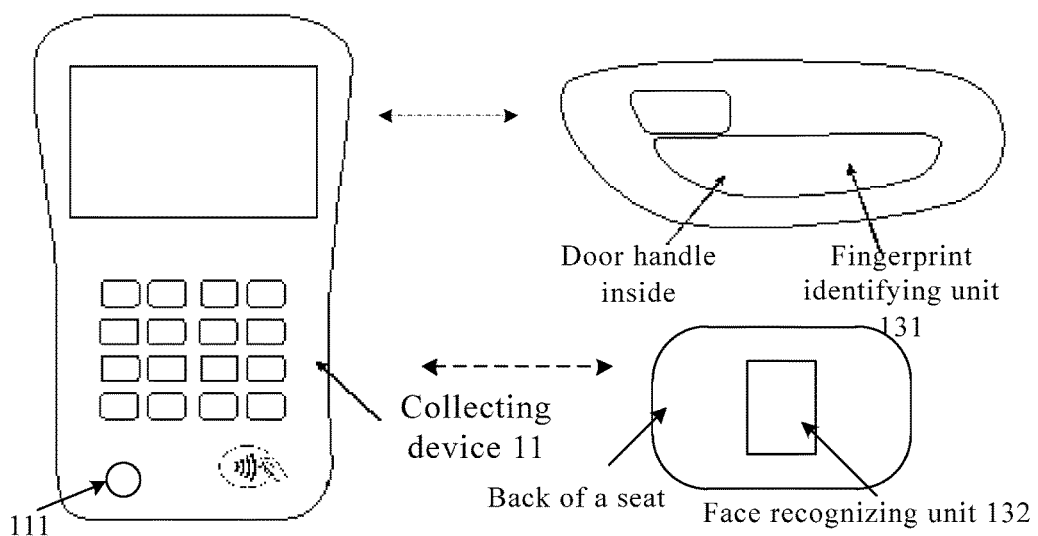
FIG. 2b is another example structure diagram of the payment system provided in embodiment 1 of the present disclosure.

Optionally, the identification device 13 may include a face recognizing unit 132 and, if the payment environment is in a vehicle, is disposed at at least one of the following locations in the payment environment: the back of a seat, the console of the vehicle, the buckle of a safety belt, vicinity of a reflecting mirror inside the vehicle and the like. As shown in FIG. 2b, the face recognizing unit 132 is disposed on the back of a seat. The payment can be secure and convenient to bring about a higher user experience by disposing a fingerprint identifying unit in a region within the visual field of the payer.

For example, the identification device 13 including the face recognizing unit 132 is disposed on the safety belt buckle of the front passenger seat in the vehicle, so that, if a customer in the vehicle is to pay, he can make his identity checked just by bowing his head and facing the safety belt buckle when he unfastens his safety belt, which can achieve both security and efficiency of payment.

It can be appreciated that the two embodiments above are illustrated in the case that the payment environment is in a vehicle, but payment can also be performed in other environments, such as at a checkout counter, a payment window or the like. For example, when payment is performed in the environment of a checkout counter in a supermarket, the identification device may be disposed at the edge of a display screen for display of amount of money, so that the customer can have his identity information checked, for example, by face recognition while looking at the prices of the articles, speeding up payment by the customer.

Optionally, the collecting device 11 may further have an identification prompting unit 1 disposed therein to prompt that the payer's identity information needs to be identified. The identification prompting unit 111 may be, for example, a speaker or a display screen to prompt the payer to enter his identity information in time by voice or picture display, further improving the user experience.

Figure 3:
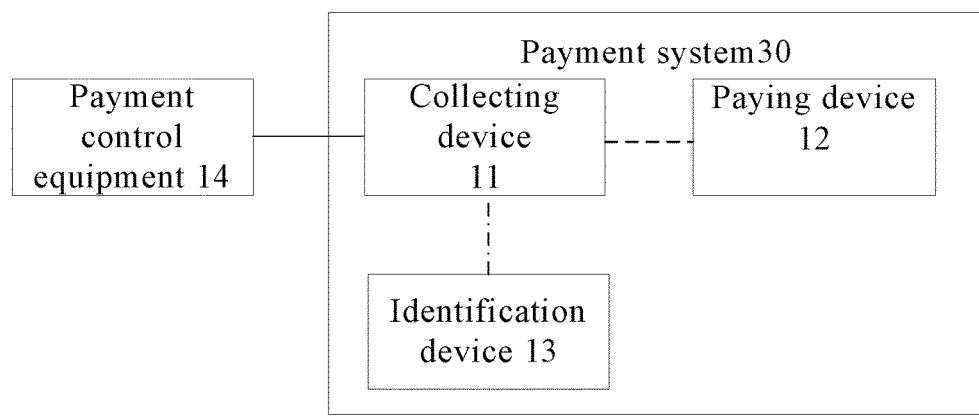
FIG. 3 is yet another structure diagram of the payment system provided in embodiment 1 of the present disclosure.

Optionally, as shown in FIG. 3, the collecting device 11 is connected with a payment control equipment 14 through network, so that the collecting device 11 may transmit the identity information of the payer to the payment control equipment 14 and receive the verification result of the payer's identity information from the payment control equipment 14. The payment control equipment 14 may be a server or any other equipment for payment control.

Connecting the collecting device with a payment control equipment through network, on the one hand, improves applicability and operability of contactless mobile payment to allow more groups such as the elderly and children to use contactless mobile payment and, on the other hand, enables the paying device of the payer to be free from networking with the payment control equipment. As a result, network traffic of the paying device is saved and it can be prevented that too many paying devices conduct payment at the same time to cause network congestion or delay of network response.

Embodiment 2

Figure 4:
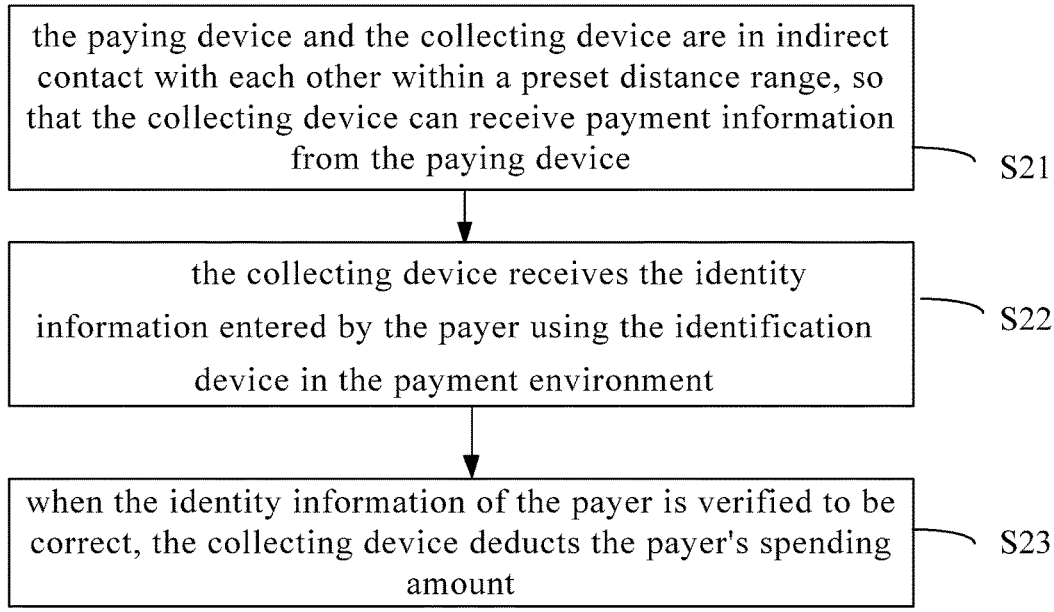
FIG. 4 is a flow chart of a payment method provided in embodiment 2 of the present disclosure.

Embodiment 2 of the present disclosure provides a payment method, which, as shown in FIG. 4, includes the following steps S21-S23.

In step S21, the paying device and the collecting device are in indirect contact with each other within a preset distance range, so that the collecting device can receive payment information from the paying device.

For example, the payee may enter a spending amount in the collecting device, and then the payer puts the paying device within a preset range of distance from the collecting device, so that the paying device is in indirect contact, for example, in inductive contact with the collecting device and thus the collecting device can receive identification codes or identifier codes from the paying device. The preset distance may have a value within a distance range allowing signal reception, for example, 0.3 m, 0.8 m, etc., and can be set to a default value by those of ordinary skills in the art from experience or to a particular value depending on a specific place. In this respect, embodiments of the present disclosure are not limited.

Optionally, in a specific embodiment of the present disclosure, after the collecting device has received the spending amount entered by the payer, step S21 may include the following step S211-S212.

In step S211, the collecting device sends prompting information to the paying device.

Optionally, the prompting information may include at least one of voice prompting information or visual prompting information.

In step S212, when the paying device receives the prompting information sent by the collecting device, the paying device and collecting device are within the preset distance range to be in indirect contact with each other, so that the collecting device can receive information from the paying device.

In the foregoing step, the prompting information from the collecting device can prompt the payer to enter his identity information in time, improving the user experience.

In step S22, the collecting device receives the identity information entered by the payer using the identification device in the payment environment. The payment environment refers to the place in which the collecting device and the paying device are located.

The identity information may include fingerprint identifying information and/or face recognizing information.

The environment for payment may be a vehicle, a checkout counter, a payment window or the like.

For example, the collecting device and the paying device may be in signal connection with each other through of wired or wireless connection and the wireless connection may use Bluetooth, Wi-Fi, NFC, RF etc. After the collecting device has received information, for example, identification codes, from the paying device, the payer enters his identity information by means of the identification device in the payment environment, and then the paying device sends the entered identity information to the collecting device, which will receive the identity information sent by the payer correspondingly.

In step S23, when the identity information of the payer is verified to be correct, the collecting device deducts the payer's spending amount.

Embodiment 2 of the present disclosure provides a payment method including putting the paying device and collecting device within a preset distance range and in indirect contact. After the collecting device has received information from the paying device, the collecting device receives the identity information entered by the payer using the identification device in the payment environment, wherein the payment environment refers to the place in which the collecting device and the paying device are located. When the identity information of the payer is verified to be correct, the collecting device deducts the payer's spending amount. From this it can be seen that by disposing an identification device in the payment environment, the embodiment of the present disclosure improves security of payment without direct contact between any part of the payer and the collecting device, so that the payer is provided with convenience for payment and can enjoy a higher user experience.

Since the collecting device may be connected with a payment control equipment in the present disclosure, optionally, in a specific embodiment of the present disclosure, after the collecting device has received the identity information entered by the payer using the identification device in the payment environment in step S22, the method further includes the following step: sending the identity information by the collecting device through a network to the payment control equipment networked with the collecting device.

In this case, deducting the payer's spending amount by the collecting device when the identity information of the payer is verified to be correct in step S23 may be: receiving the verification result of the payer's identity information by the collecting device from the payment control equipment and deducting the payer's spending amount by the collecting device if the verification result indicates that the payer's identity information is correct.

Connecting the collecting device with a payment control equipment through network improves applicability and operability of contactless mobile payment to allow more groups such as the elderly and children to use contactless mobile payment on the one hand and enables the paying device of the payer to be free from networking with the payment control equipment on the other hand. Thereby, network traffic of the paying device is saved and it can be prevented that too many paying devices conduct payment at the same time to cause network congestion or delay of network response.

Considering that in some instances the payer may pay directly without verification of identity information before payment, for example, when the spending amount is relatively small or the place for payment is trusted, optionally, in a specific embodiment of the present disclosure, after entering the spending amount of the payer in the collecting device in step S21 and, for example, before putting the paying device and the collecting device within a preset distance range and in indirect contact, the method further includes the step of determining whether identification is needed.

The state of a setting for transaction security can be set according to whether the place for payment is secure, and a limit can be set for quick payment of a small amount according to the magnitude of the transaction amount of money, so that the paying device may determine whether identification is needed based on the state of the setting for transaction security and/or quick payment of a small amount.

Optionally, after the payer's spending amount has been entered into the collecting device, the payer's paying device determines whether identification is needed based on the state of the setting for transaction security and/or the limit for quick payment of a small amount; if identification of the payer is not needed, when the collecting device is in indirect contact with and has received information from the paying device, the collecting device deducts the payer's spending amount from the paying device directly, while if identification of the payer is needed, when the collecting device is in indirect contact with and has received information from the paying device, the collecting device receives the identity information entered by the payer using the identification device in the payment environment to perform the step of identification.

Embodiment 3

Figure 5:
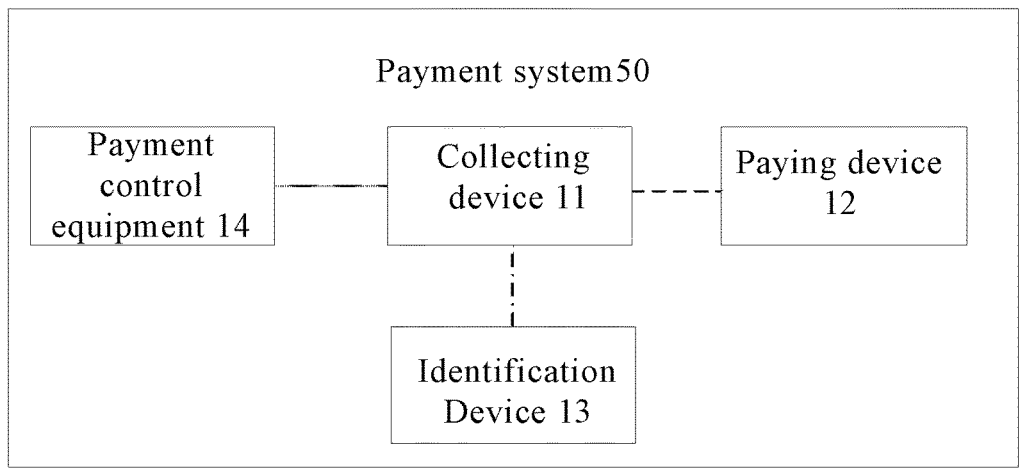
FIG. 5 is a structure diagram of a payment system provided in embodiment 3 of the present disclosure.

Embodiment 3 of the present disclosure further provides another payment system. FIG. 5 is a structure diagram of another payment system provided in the embodiment of the present disclosure. The payment system 50 further includes a payment control equipment 14 in addition to the collecting device 11, paying device 12 and identification device 13 included in the payment system 10 in embodiment 1. The collecting device 11 is connected with the control equipment 14 through network. The payment control equipment 14 is used to receive and verify the payer's identity information. The collecting device 11 is used to transmit the identity information of the payer to the payment control equipment 14 and receive the verification result of the payer's identity information from the payment control equipment 14. The payment control equipment 14 may be a server or other equipment for payment control. Embodiment 1 of the present disclosure may be referred to for specific implementation, which will not be repeated here.

Embodiment 4

Figure 6:
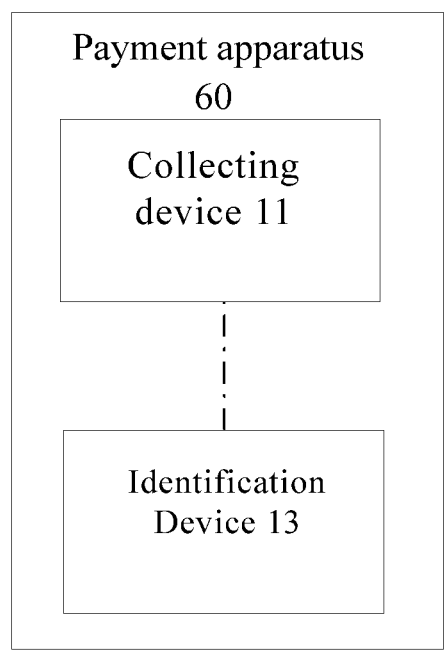
FIG. 6 is a structure diagram of a payment apparatus provided in embodiment 4 of the present disclosure.

Embodiment 4 of the present disclosure further provides a payment apparatus 60. FIG. 6 is a structure diagram of a payment apparatus provided in embodiment 4 of the present disclosure. As shown in FIG. 6, the payment apparatus 60 includes the collecting device 11 and the identification device 13 in embodiment 1 of the present disclosure described above. Embodiment 1 of the present disclosure may be referred to for specific structures and functions of the above-mentioned two devices, which will just be briefly introduced here.

In accordance with an example of the present disclosure, the collecting device 11 includes a transceiver which is in signal connection with the paying device 12 so as to receive information from it. The identification device 13 is disposed in the payment environment to be spatially separate from the paying device 12 and in signal connection with the collecting device 11, so that the identification device is used to identify the identity information of the payer when the payer is to pay an amount of money, wherein the payment environment is the place in which the collecting device 11 and the paying device 12 are located at the same time.

Optionally, the identification device 12 includes a fingerprint identifying unit. For example, when the payment environment is in a vehicle, the identification device 13 may be disposed at at least one of the following locations in the payment environment: a door handle inside the vehicle, the button of a glass frame riser in the vehicle, a safety belt buckle and a lateral seat regulating lever.

Optionally, the identification device includes a face recognizing unit. For example, when the payment environment is in a vehicle, the identification device is disposed at at least one of following locations in the payment environment: the back of a seat, the console of the vehicle, the buckle of a safety belt and vicinity of a reflecting mirror inside the vehicle.

Additionally, the collecting device 11 may have an identification prompting unit disposed therein to prompt that the payer's identity information needs to be identified.

Embodiments of the present disclosure provide a payment system, a payment apparatus and a payment method. In the payment system, an identification device is disposed in the payment environment but in the collecting device, so that payment may be completed without direct contact between the payer and the collecting device. This payment system can both improve security of payment and provide convenience for payment, providing a higher user experience.

What are described above is related to the illustrative embodiments of the disclosure only and not limitative to the scope of the disclosure. Obvious variations and replacement by any one of the skilled person in the art in the technical scope of the disclosure should be all covered in the scope of this disclosure. The scopes of the disclosure are defined by the accompanying claims.

The present application claims priority of China Patent application No. 201510152761.3 filed on Apr. 1, 2015, the content of which is incorporated in its entirety as part of the present application by reference herein.

The invention claimed is:

1. A contactless mobile payment system applied in a scenario that a payment transaction is directly performed by a payer from within the payer's vehicle and using a payer mobile computing device, wherein the payment transaction is made without verification of identity information of the payer before the payment, wherein the state of the payment tar transaction is set to a secure setting and/or the payment transaction amount of money does not exceed a limit for quick payment, the payment system comprising:
   a hand-held collecting device within a close preset distance range to the payer mobile computing device within the vehicle, wherein the collecting device comprises a mobile point of sale terminal for collecting payment information from the payer mobile computing device,
   a paying device comprising the payer mobile computing device and located in the vehicle, the paying device being in contactless electronic communication with the collecting device through close range electromagnetic induction, so that the collecting device can receive information from the paying device, wherein the paying device determines whether a payer's identity information needs to be identified based on the state for transaction security and/or the limit for quick payment, wherein the paying device prompts the payer to provide identification information,
   an identification device that is disposed in the vehicle and spatially separate from the paying device and in contactless close range electronic communication with the collecting device, wherein the identification device is used to identify the identity information of the payer when the payer is to pay an amount of money to complete the payment transaction and when the paying device determines the payer's identity information needs to be identified in order to complete the payment transaction, wherein the identification device transmits the payer identification information to the collecting device, wherein the paying device and the identification device are located in the vehicle at the same time whereby the payer can remain seated in the vehicle and provide biometric identification information to the identification device, and wherein the identification device comprises at least one of:
      a fingerprint sensor within reach of the hand of the payer for scanning the fingerprint of the payer;
      an audio sensor within the voice of the payer for sensing the voice print of the payer; and
      a face recognizing unit with a camera directed at the face of the payer seated in the vehicle for identifying the face of the payer, and
   a payment control computing equipment, wherein the collecting device is in contactless electronic communication with the payment control computing equipment through a communications network, wherein the collecting device sends the payer's identity information to, and receives verification result of the payer's identity information from, the payment control computing equipment wherein the payment control computing equipment comprises a server associated with the financial institution of the payer.

2. The payment system of claim 1, wherein
   the collecting device further has an identification prompting unit disposed therein to prompt that the payer's identity information needs to be identified.

3. A contactless mobile payment apparatus applied in a scenario that a payment transaction is directly performed by a payer from within the payer's vehicle and using a payer mobile computing device, wherein the payment transaction is made without verification of identity information of the payer before the payment, wherein the state of the payment transaction is set to a secure setting and/or the payment transaction amount of money does not exceed a limit for quick payment, the contactless mobile payment apparatus comprising:
   a hand-held collecting device within a close preset distance range to the payer mobile computing device within the vehicle, wherein the collecting device comprises a mobile point of sale terminal for collecting payment information from the payer mobile computing device, the hand-held collecting device comprising a transceiver to build signal connection with and be able to receive information from a paying device,
   an identification device that is disposed in the vehicle and spatially separate from the paying device and in contactless close range electronic communication with the collecting device, wherein the identification device is used to identify the identity information of the payer when the payer is to pay an amount of money to complete the payment transaction and when it is determined that payer's identity information needs to be identified in order to complete the payment transaction based on the state for transaction security and/or the limit for quick payment, wherein the identification device transmits the payer identification information to the collecting device, and wherein the paying device and the identification device are located in the vehicle at the same time whereby the payer can remain seated in the vehicle and provide biometric identification information to the identification device, and wherein the identification device comprises at least one of:
      a fingerprint sensor within reach of the hand of the payer for scanning the fingerprint of the payer;
      an audio sensor within the voice of the payer for sensing the voice print of the payer; and
      a face recognizing unit with a camera directed at the face of the payer seated in the vehicle for identifying the face of the payer, and
   a payment control computing equipment, wherein the collecting device is in contactless electronic communication with the payment control computing equipment through a communications network, wherein the collecting device sends the payer's identity information to, and receives verification result of the payer's identity information from, the payment control computing equipment, wherein the payment control computing equipment comprises a server associated with the financial institution of the payer.

4. The payment apparatus of claim 3, wherein
   the collecting device further has an identification prompting unit disposed therein to prompt that the payer's identity information needs to be identified.

* * * * *